US012695391B2

(12) United States Patent　　　　(10) Patent No.:　US 12,695,391 B2
Li et al.　　　　　　　　　　　　　　(45) Date of Patent:　　　Jul. 28, 2026

(54) BIDIRECTIONAL ISOLATED HIGH VOLTAGE DC-DC CONVERTER

(71) Applicant: Parker-Hannifin Corporation, Cleveland, OH (US)

(72) Inventors: Mark Y. Li, Irvine, CA (US); Shengming Li, Irvine, CA (US); Patrick C. Toops, Charleston, WV (US)

(73) Assignee: Parker-Hannifin Corporation, Cleveland, OH (US)

( * ) Notice: Subject to any disclaimer, the term of this patent is extended or adjusted under 35 U.S.C. 154(b) by 170 days.

(21) Appl. No.: 18/728,905

(22) PCT Filed: Mar. 9, 2023

(86) PCT No.: PCT/US2023/064008
§ 371 (c)(1),
(2) Date: Jul. 15, 2024

(87) PCT Pub. No.: WO2023/205550
PCT Pub. Date: Oct. 26, 2023

(65) Prior Publication Data
US 2025/0105730 A1　　　Mar. 27, 2025

Related U.S. Application Data

(60) Provisional application No. 63/332,038, filed on Apr. 18, 2022.

(51) Int. Cl.
*H02M 3/335*　　　(2006.01)
*H02M 1/00*　　　(2006.01)
(Continued)

(52) U.S. Cl.
CPC ..... *H02M 3/33584* (2013.01); *H02M 1/0095* (2021.05); *H02M 3/01* (2021.05); *H02M 1/36* (2013.01)

(58) Field of Classification Search
CPC .. H02M 3/33584; H02M 3/01; H02M 1/0095; H02M 1/36
See application file for complete search history.

(56) References Cited

U.S. PATENT DOCUMENTS 10,298,057 B2　5/2019　Mi et al.
10,396,676 B2　8/2019　Yang et al.
(Continued)

FOREIGN PATENT DOCUMENTS

WO　　2021127995 A1　7/2021

OTHER PUBLICATIONS

International Search Report and Written Opinion issued for corresponding International Patent Application No. PCT/US2023/064008, mailed Jun. 20, 2023.
(Continued)

*Primary Examiner* — Alex Torres-Rivera
(74) *Attorney, Agent, or Firm* — Renner, Otto, Boisselle & Sklar, LLP

(57)　　　ABSTRACT

A bidirectional isolated high voltage DC-DC converter includes a primary three-level circuit, a capacitor-inductor-inductor-capacitor (CLLC) resonant tank network connected to the primary three-level circuit, a secondary three-level circuit connected to the CLLC resonant tank network, and a controller that controls one or more of the components of the bidirectional isolated high voltage DC-DC converter. The primary three-level circuit and the secondary three-level circuit include capacitor middle points having respective voltages that are actively controlled by the controller. The controller implements a novel space vector PWM (SVPWM). The secondary capacitor middle point is chassis grounded to provide an optimal system level partial discharge hazard management for aircraft. vehicle and vessel
(Continued)

AN EXEMPLARY ELECTRICAL CIRCUIT DIAGRAM OF THE BIDIRECTIONAL ISOLATED HIGH VOLTAGE DC-DC CONVERTER OF FIG. 1 applications. GaN power MOSFETs are used for high frequency operation of the power switches.

20 Claims, 14 Drawing Sheets

(51) Int. Cl.
H02M 3/00 (2006.01)
H02M 1/36 (2007.01)

(56) References Cited

U.S. PATENT DOCUMENTS

| | | | | |
|---|---|---|---|---|
| 10,608,522 | B2 | 3/2020 | De Doncker et al. | |
| 10,630,190 | B2 | 4/2020 | Tayebi et al. | |
| 11,088,625 | B1 | 8/2021 | Cao et al. | |
| 11,128,251 | B1 * | 9/2021 | Solodovnik | H02H 7/0838 |
| 2019/0356239 | A1 * | 11/2019 | Okudera | H02M 7/48 |
| 2020/0274443 | A1 * | 8/2020 | Itogawa | H02M 3/33573 |
| 2020/0412238 | A1 * | 12/2020 | Zhu | H02M 1/4241 |
| 2021/0013812 | A1 * | 1/2021 | Huang | H02M 7/483 |
| 2024/0079967 | A1 * | 3/2024 | Shuai | H02M 7/483 |

OTHER PUBLICATIONS

Yingying Cai et al: "Design of a high-frequency isolated DTHB CLLC bidirectional resonant DC-DC converter", 2014 IEEE Conference and Expo Transportation Electrification Asia-Pacific (ITEC Asia-Pacific), IEEE, Aug. 31, 2014 (Aug. 31, 2014), pp. 1-6, XP032671567, DOI: 10.1109/ITEC-AP.2014.6941091.

Asadi Ehsan et al: "A Modified Discontinues PWM to Reduce Common Mode Voltage and Switching Loss for Photovoltaic Transformerless T-Type Inverter", 2020 11th Power Electronics, Drive Systems, and Technologies Conference (PEDSTC), IEEE, Feb. 4, 2020 (Feb. 4, 2020), pp. 1-5, XP033769383, DOI: 10.1109/PEDSTC49159.2020.9088450.

Second Written Opinion issued for corresponding International Patent Application No. PCT/US2023/064008, mailed Nov. 16, 2023.

Jiang Tianyang et al: "PWAM control of bidirectional LLC resonant converter", 2013 1st International Future Energy Electronics Conference (IFEEC), IEEE, Nov. 3, 2013 (Nov. 3, 2013), pp. 827-832, XP032531775, DOI: 10.1109/IFEEC.2013.6687616.

* cited by examiner

AN EXEMPLARY ELECTRICAL CIRCUIT DIAGRAM OF THE BIDIRECTIONAL ISOLATED HIGH VOLTAGE DC-DC CONVERTER OF FIG. 1

(A) VOLTAGE VECTOR DIAGRAM WHEN $v_{p,pu} > 0$ (B) VOLTAGE VECTOR DIAGRAM OF PRIMARY SIDE THREE-LEVEL FULL-BRIDGE CONVERTER

THE ONE-DIMENSIONAL SPACE VECTOR DIAGRAM WHEN $v_{p,pu} < 0$

PROPOSED CAPACITOR MIDDLE POINT VOLTAGE CONTROLLER FOR THREE-LEVEL FULL BRIDGE LLC CONVERTER
(ILLUSTRATED ON THE PRIMARY SIDE)

DOUBLE-CARRIER PWM IMPLEMENTATION

MODE 1 - Q1P/Q2P/Q7P/Q8P AND Q1S/Q4S ARE TURNED ON, ALL REST ARE OFF

MODE 2 - Q1P/Q2P/Q7P/Q8P AND Q4S/Q5/Q6S ARE TURNED ON, ALL REST ARE OFF

MODE 3 - Q1P/Q2P/Q6P/Q7P AND Q4S/Q5/Q6S ARE TURNED ON, ALL REST ARE OFF

MODE 4 - Q3P/Q4P/Q5P/Q6P AND Q2S/Q3 ARE TURNED ON, ALL REST ARE OFF

MODE 5 - Q3P/Q4P/Q3P/Q6P AND Q2S/Q7/Q8S ARE TURNED ON, ALL REST ARE OFF

MODE 6 - Q2P/Q3P/Q6P/Q6P AND Q2S/Q7/Q8S ARE TURNED ON, ALL REST ARE OFF

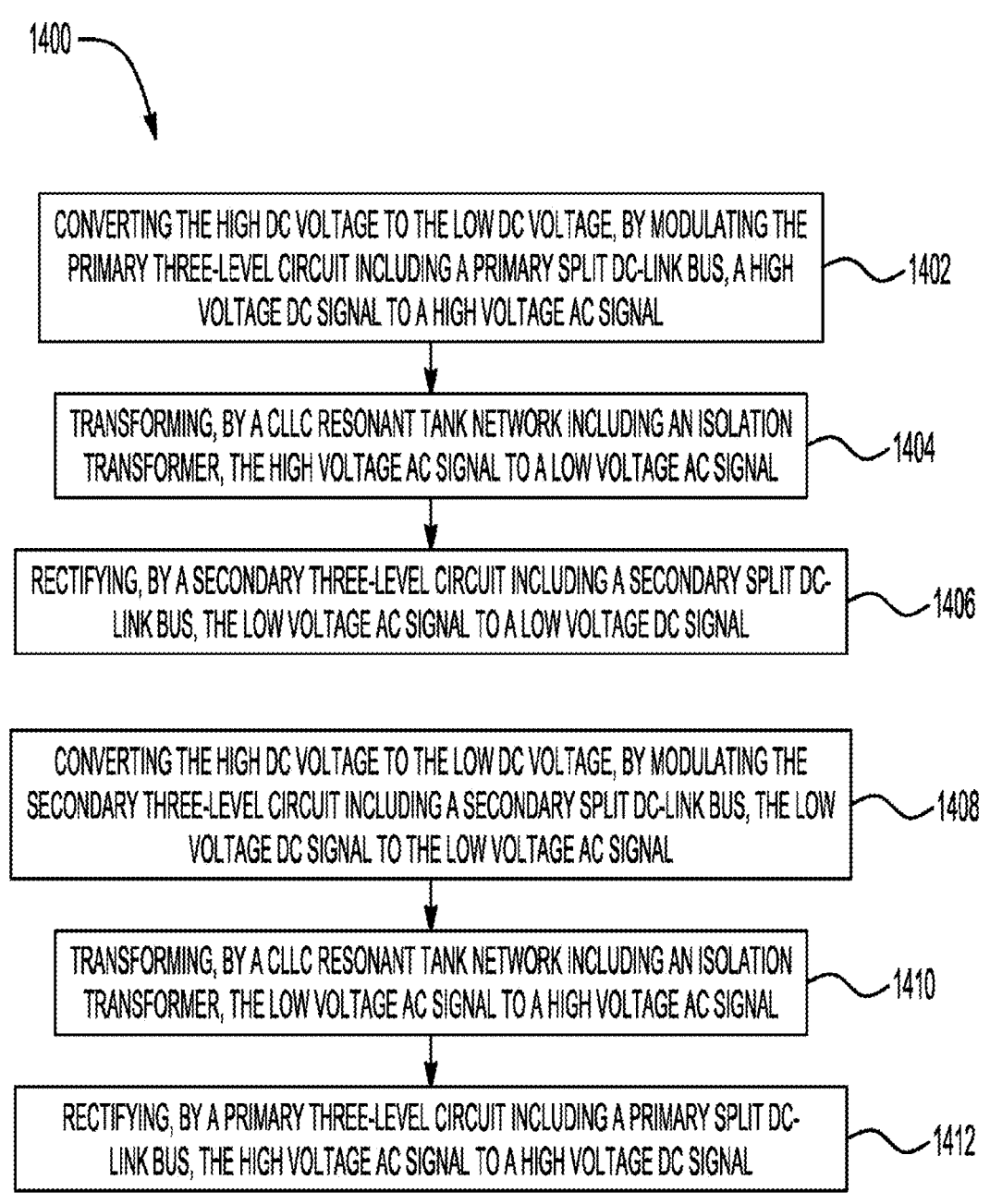

1400

CONVERTING THE HIGH DC VOLTAGE TO THE LOW DC VOLTAGE, BY MODULATING THE PRIMARY THREE-LEVEL CIRCUIT INCLUDING A PRIMARY SPLIT DC-LINK BUS, A HIGH VOLTAGE DC SIGNAL TO A HIGH VOLTAGE AC SIGNAL — 1402

TRANSFORMING, BY A CLLC RESONANT TANK NETWORK INCLUDING AN ISOLATION TRANSFORMER, THE HIGH VOLTAGE AC SIGNAL TO A LOW VOLTAGE AC SIGNAL — 1404

RECTIFYING, BY A SECONDARY THREE-LEVEL CIRCUIT INCLUDING A SECONDARY SPLIT DC-LINK BUS, THE LOW VOLTAGE AC SIGNAL TO A LOW VOLTAGE DC SIGNAL — 1406

CONVERTING THE HIGH DC VOLTAGE TO THE LOW DC VOLTAGE, BY MODULATING THE SECONDARY THREE-LEVEL CIRCUIT INCLUDING A SECONDARY SPLIT DC-LINK BUS, THE LOW VOLTAGE DC SIGNAL TO THE LOW VOLTAGE AC SIGNAL — 1408

TRANSFORMING, BY A CLLC RESONANT TANK NETWORK INCLUDING AN ISOLATION TRANSFORMER, THE LOW VOLTAGE AC SIGNAL TO A HIGH VOLTAGE AC SIGNAL — 1410

RECTIFYING, BY A PRIMARY THREE-LEVEL CIRCUIT INCLUDING A PRIMARY SPLIT DC-LINK BUS, THE HIGH VOLTAGE AC SIGNAL TO A HIGH VOLTAGE DC SIGNAL — 1412

FIG. 14

BIDIRECTIONAL ISOLATED HIGH VOLTAGE DC-DC CONVERTER

This application is a national phase of International Application No. PCT/US2023/064008 filed Mar. 9, 2023, which claims priority to U.S. Provisional Application No. 63/332, 038 filed Apr. 18, 2022, each of which is hereby incorporated herein by reference in its entirety.

FIELD OF INVENTION

The present application relates generally to bidirectional DC-DC converters, and more particularly to a bidirectional isolated high voltage DC-DC converter and a method of bidirectionally converting between a high DC voltage and a low DC voltage.

BACKGROUND OF THE INVENTION

As electric consumers, such as electric vehicles, shift to using electric systems having relatively high electric power needs, high voltage power distribution systems are needed. For example, in an electric vertical take-off and landing (eVTOL) aircraft, electric propulsion systems and flight control actuation systems can be used to hover, take off, and land vertically. One exemplary power distribution system proposed to handle the electric power needs of such electric systems is an 800 VDC bus. Using high voltage DC buses may be beneficial for conventional power distribution systems. Using such high voltage DC buses in vehicle power distribution systems poses some challenges. One problem may include integrating low voltage systems and components, such as solenoid drives, cooling systems, and housekeeping power supplies, with the high voltage DC bus. Another challenge may be providing sufficient protection against corona effects, such as electrical losses which may increase as voltage increases during extensive use.

In the past, a traditional design practice may include the redesign of an entire actuation system to accommodate a high voltage power bus. Here all components are sized to worst-case DC bus voltage level scenarios, resulting in low efficiency and low power density solutions.

Inrush current control upon abrupt input voltage application is a standard requirement for most motor applications employed to protect against corona effects. Conventional designs use insulated-gate bipolar transistors (IGBTs) to emulate a mechanical contact with pre-charging, or to shunt out the series charging resistor at a bus link capacitor. One drawback associated with these conventional designs is that the conventional designs provide weak disconnect capability upon motor drive inverter bridge failure. Such failure is greatly impacted by a need for brute force disconnecting a short fault under a highly inductive DC bus due to Electromagnetic interference (EMI) filtering and power distribution.

Conventional actuation systems use low voltage DC buses and typically float on internal DC bus rails from a chassis unless an input bus is referenced to the chassis at its return. Added random common-mode fluctuations deteriorate the partial discharge hazard situation related to electronics controller and downstream actuator motors.

SUMMARY OF INVENTION

The present application describes a bidirectional isolated high voltage DC-DC converter. The bidirectional isolated high voltage DC-DC converter may include a primary three-level circuit, a capacitor-inductor-inductor-capacitor (CLLC) resonant tank network connected to the primary three-level circuit, a secondary three-level circuit connected to the CLLC resonant tank network, and a controller that controls one or more of the components of the bidirectional isolated high voltage DC-DC converter. The primary three-level circuit and the secondary three-level circuit may include capacitor middle points with respective voltages that are actively controlled by the controller. The CLLC resonant tank network includes an isolation transformer that separates the primary side from the secondary side of the bidirectional high voltage DC-DC converter.

The primary three-level circuit interfaces with a relatively high voltage DC power bus and the secondary three-level circuit interfaces with relatively low voltage loads. The three-level structure of the primary three-level circuit and the active capacitor middle point voltage control on the primary side of the bidirectional isolated high voltage DC-DC converter allows the high voltage side to be split into two segments. The three-level structure of the secondary three-level circuit, the isolation transformer of the CLLC resonant tank network, and the active capacitor middle point voltage control on the secondary side of the bidirectional isolated high voltage DC-DC converter all allow the low voltage side to be split into two segments such as symmetrical dual supplies with a common reference connected to an electronics chassis.

In some implementations, the primary three-level circuit and the secondary three-level circuit include switching devices and capacitors that are 50% voltage rated compared to conventional two-level DC-DC converter devices. This allows the primary three-level circuit and the secondary three-level circuit to use relatively lower voltage switching devices, such as 600V semiconductor switches. Such switches include gallium nitride (GaN)-based transistors used for very high pulse width modulation (PWM) switching frequency operation in high voltage bus applications, such as in a 1000 Direct Current Voltage (VDC) bus application.

The bidirectional isolated high voltage DC-DC converter of the present disclosure provides an optimized solution to system level partial discharge hazard management. It also enables interfacing of standard power systems, such as ±135 VDC or 270 VDC flight control actuation systems, with high voltage DC buses, such as high voltage DC buses in electric vehicles.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 14 presents an exemplary flow diagram for a method for bidirectionally converting a high DC voltage to a low DC voltage.

DETAILED DESCRIPTION

Figure 1:
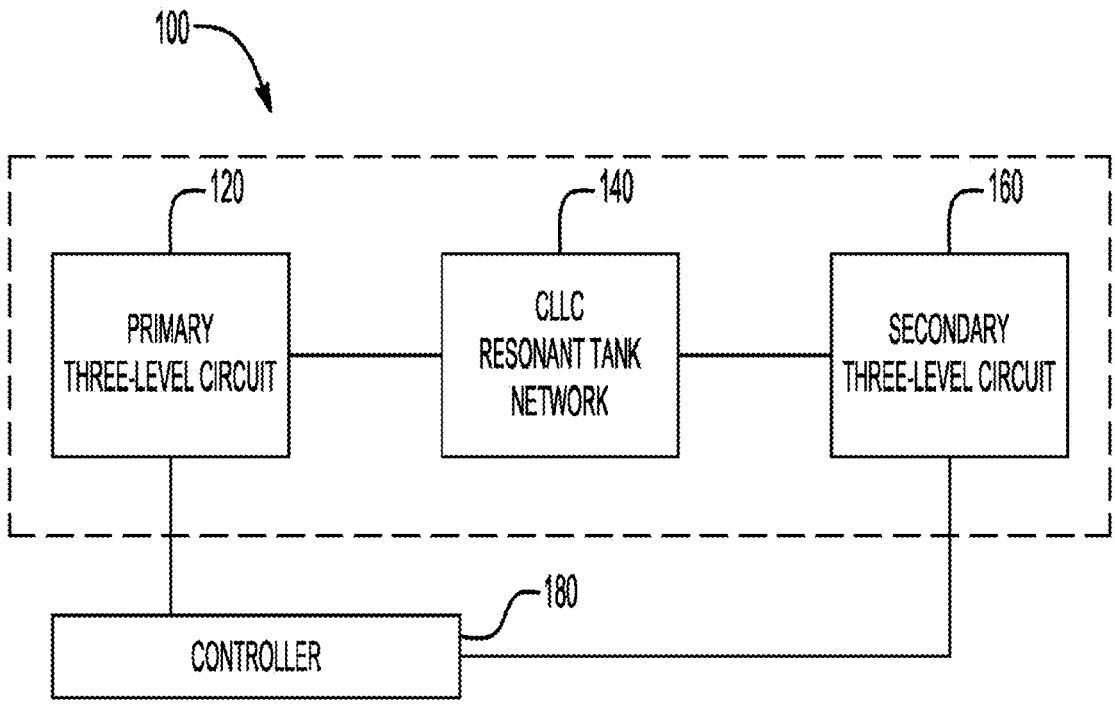
FIG. 1 presents a schematic block diagram of an exemplary bidirectional isolated high voltage DC-DC converter.

Embodiments of the present application will now be described with reference to the drawings, wherein like reference numerals are used to refer to like elements throughout. It will be understood that the figures are not necessarily to scale.

FIG. 1 presents a schematic block diagram of an exemplary bidirectional isolated high voltage DC-DC converter 100. In the example of FIG. 1, the bidirectional isolated high voltage DC-DC converter 100 includes a primary three-level circuit 120, a capacitor-inductor-inductor-capacitor (CLLC) resonant tank network connected to the primary three-level circuit 120, a secondary three-level circuit 160 connected to the CLLC resonant tank network, and a controller 180 that controls one or more of the components of the bidirectional isolated high voltage DC-DC converter 100. The primary three level circuit 120 interfaces with a relatively high voltage DC power bus, such as an 800 VDC power bus of an aircraft, while the secondary three-level circuit interfaces with relatively low voltage loads, such as 270 VDC (or ×135 VDC) standard EM actuation flight control motor drives, 135 VDC solenoid drives, cooling systems, and/or housekeeping power supplies of an aircraft. It will be appreciated that such usages are examples, and the bidirectional isolated high voltage DC-DC converter 100 is not limited to any specific application.

The bidirectional isolated high voltage DC-DC converter 100 operates in a forward direction to convert high voltage DC power into low voltage DC power and a reverse direction to convert low voltage DC power into high voltage DC power. For example, when the bidirectional isolated high voltage DC-DC converter 100 operates in a forward direction, e.g., 800 VDC, power from the high voltage power bus can be converted into 270 VDC (or ±135 VDC) power to provide DC power to low voltage loads of the vehicle. In the event regenerative energy, such as low voltage DC power, is available, the low voltage 270 VDC (or ±135 VDC) power can be converted into 800 VDC power to supply DC power to the high voltage power bus. This capacity would be useful, for example, in aiding load conditions on aircraft control surfaces or a control surface deceleration.

Figure 2:
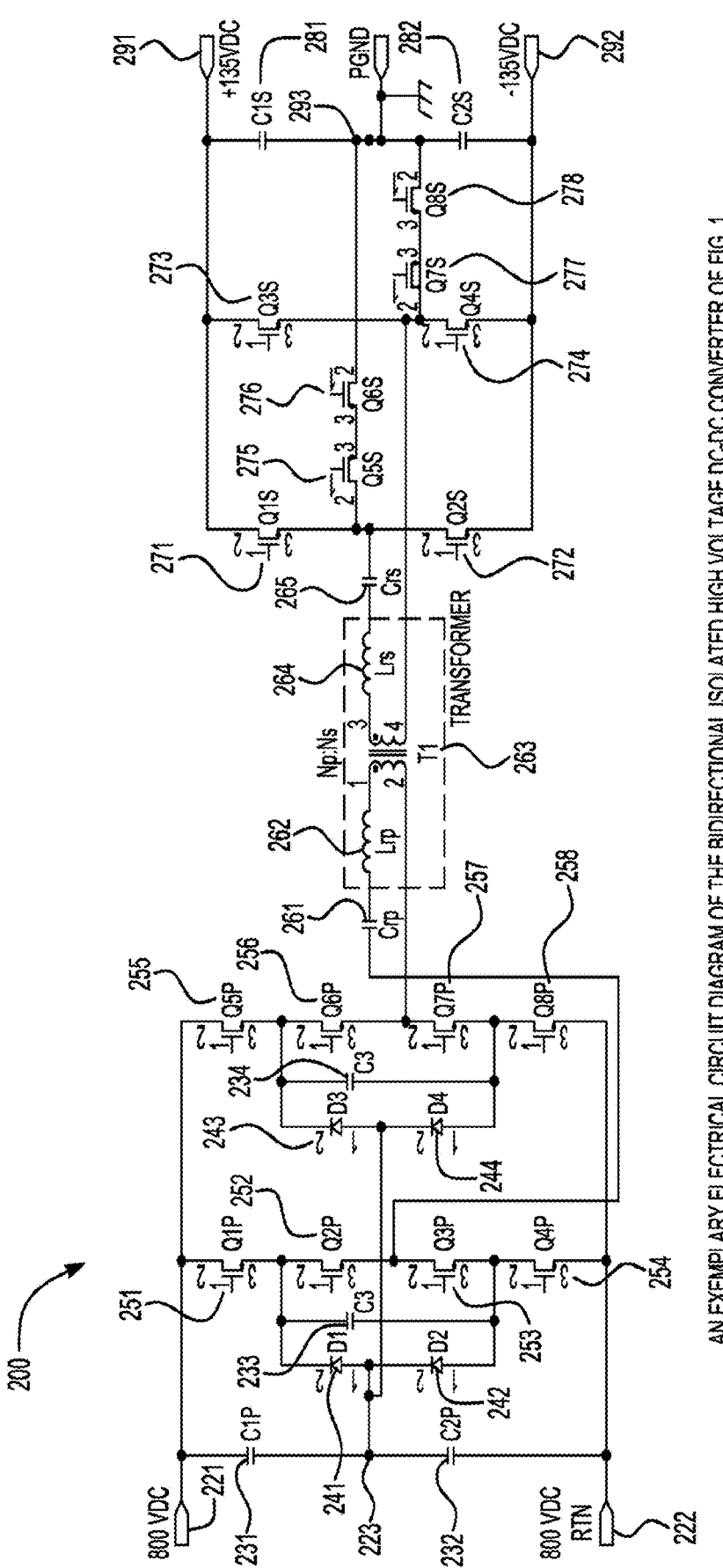
FIG. 2 presents an exemplary electrical circuit diagram of the bidirectional isolated high voltage DC-DC converter.

FIG. 2 presents one implementation 200 of the bidirectional isolated high voltage DC-DC converter of FIG. 1, wherein the primary three-level circuit 120 is a neutral-point-clamped (NPC) three-level full bridge circuit, the CLLC resonant tank network 140 is connected to the NPC three-level full bridge circuit, and the secondary three-level circuit 160 is a T-type three-level circuit connected to the CLLC resonant tank network. The device also contains a controller 180.

The NPC three-level full bridge circuit includes a primary split DC-link bus, a first primary phase leg, and a second primary phase leg. The primary split DC-link bus includes capacitors C1P 231 and C2P 232, a primary positive DC bus 221, a primary capacitor middle point 223, and a primary negative DC bus 222.

The first primary phase leg includes switching devices Q1P 251, Q2P 252, Q3P 253, and Q4P 254, diodes D1 241 and D2 242, and capacitor C3 233. The two clamping diodes D1 and D2 are connected to the primary capacitor middle point of the primary split DC-link bus. The second primary phase leg includes switching devices Q5P 255, Q6P 256, Q7P 257, and Q8P 258, diodes D3 243 and D4 244, and capacitor C4 234. The two clamping diodes D3 and D4 are connected to the primary capacitor middle point of the primary split DC-link bus as well.

The primary phase legs can operate at three different voltage levels by controlling respective switching devices Q1P-Q8P 251-258 via the controller 180 regardless of the resonant tank current direction. For example, the first primary phase leg can operate at either a voltage level of +800 VDC, which occurs when switching devices Q1P 251 and Q2P 252 are in an on state; or in a primary capacitor middle point voltage associated with the primary capacitor middle point when Q2P 252 and Q3P 253 are in an on state; or at 800 VDC RTN, when Q3P 253 and QP4 254 are in an on state. The primary capacitor middle point voltage is actively controlled via the controller 180 such as by applying PWM control signals.

The CLLC resonant tank network 140 includes resonant capacitors Crp 261 and Crs 265, resonant inductors Lrp 262 and Lrs 264, and an isolation transformer T1 263. Resonant capacitor Crp 262 and resonant inductor Lrp 262 are connected in series with one another, and resonant capacitor Crs 265 and resonant inductor Lrs 264 are connected in series with one another. Isolation transformer T1 263 includes a primary winding and a secondary winding. The primary winding includes terminals 1 and 2 and the secondary winding includes terminals 3 and 4. Resonant inductor Lrp 262 is connected to terminal 1 of the primary winding and resonant inductor Lrs 264 is connected to terminal 3 of the secondary winding. Resonant capacitor Crp 261 is connected to the first primary phase leg of the NPC three-level full bridge circuit at a point between switching devices Q2P 252 and Q3P 253. Terminal 2 of the primary winding is connected to the second primary phase leg at a point between switching devices Q6P 256 and Q7P 257. The resonant inductor Lrp 262, resonant inductor Lrs 264 and the isolation transformer T1 263 can be integrated into a single physical device. The CLLC resonant tank network 140 operates to provide isolation, voltage gain or reduction and energy transfer. With the correct parameters, it also enables zero voltage switching of the power switches within the primary phase legs in the forward power flow condition and within the secondary phase legs in the reverse power flow condition.

The T-type three-level circuit includes a secondary split DC-link bus, a first secondary phase leg, and a second secondary phase leg. The secondary split DC-link bus includes capacitors C1S 281 and C2S 282, a secondary positive DC bus 291, a secondary capacitor middle point 293, and a secondary negative DC bus 292. In the example of FIG. 2, the secondary positive DC bus 160 is associated with a positive low voltage DC power, e.g., +135 VDC 291, the secondary capacitor middle point voltage is the secondary reference and is associated with the secondary capacitor middle point, and the secondary negative DC bus is associated with a negative low voltage DC power, e.g., −135 VDC 292. The secondary capacitor middle point voltage is actively controlled via the controller 180 such as by applying PWM control signals.

The first secondary phase leg includes switching devices Q1S 271, Q2S 272, Q5S 275, and Q6S 276. The second secondary phase leg includes switching devices Q3S 273, Q4S 274, Q7S 277, and Q8S 278. The first secondary phase leg and the second secondary phase leg are connected to the secondary capacitor middle point of the secondary split DC-link bus through Q5S/Q6S and Q7S/Q8S respectively. Switching devices Q1S 271, Q2S 272, Q5S 275, and Q6S 276 of the first secondary phase leg, and switching devices Q3P 273, Q4P 274, Q7P 277, and Q8P 278 of the second secondary phase leg, can be controlled to implement various switching stages as described more fully below. In forward conversion mode, the T-type three level circuit rectifies an alternating polarity waveform received from the output of the isolation transformer to a single polarity waveform.

When operating in the forward direction. the NPC three-level full bridge circuit receives an input voltage from the DC power bus, such as for example an 800 VDC voltage, from a power bus of a vehicle. The controller 180 applies control signals, such as PWM control signals, to the switching devices Q1P-Q8P 251-258 to modulate the 800 VDC voltage into a high-frequency AC square wave. The primary capacitor middle point voltage regulation function, such as the active middle point primary voltage control, can be integrated into the PWM control signals which determines the pulse duration and sequence of the phase terminal at each of the possible voltage levels. The switching devices Q1P-Q8P 251-258 are soft switched through the primary side of the CLLC resonant tank network. The isolation transformer of the CLLC resonant tank network steps down the high frequency alternating voltage. The controller 180 applies control signals, such as PWM control signals, to the switching devices Q1S-Q8S 271-278 of the T-type three-level circuit to rectify the high frequency alternating voltage into a relatively low VDC output voltage, such as for example a 270 VDC (or ±135 VDC) voltage, to power low voltage loads. The switching devices Q1S-Q8S 271-278 are soft switched through the secondary side of the CLLC resonant tank network.

As such, the T-type three-level circuit is at a lower voltage level and a higher current level compared to the voltage level and current level of the NPC three-level full bridge circuit. The secondary capacitor middle point voltage regulation function, such as active middle point secondary voltage control, can also be integrated into the PWM control signals. Since the isolation transformer is present in the resonant conversion process, the secondary capacitor middle point can be connected to a ground that is referenced to an electronics chassis. This creates a ±135 VDC internal power bus with the secondary capacitor middle point referenced to the electronics chassis.

When operating in the reverse direction, the T-type three-level circuit receives an input VDC voltage, such as for example a ±135 VDC voltage, from a low voltage source. The controller 180 applies control signals, such as PWM control signals, to the switching devices Q1S-Q8S 271-278 to modulate the ±135 VDC voltage into a high-frequency AC square wave. The isolation transformer of the CLLC resonant tank network steps up the high frequency alternating voltage. The controller 180 applies control signals, such as PWM control signals, to the switching devices Q1P-Q8P 251-258 of the NPC three-level full bridge circuit to rectify the high frequency alternating voltage into a relatively high VDC output voltage, such as for example an 800 VDC voltage, to supply power to the VDC power bus.

Figure 3:
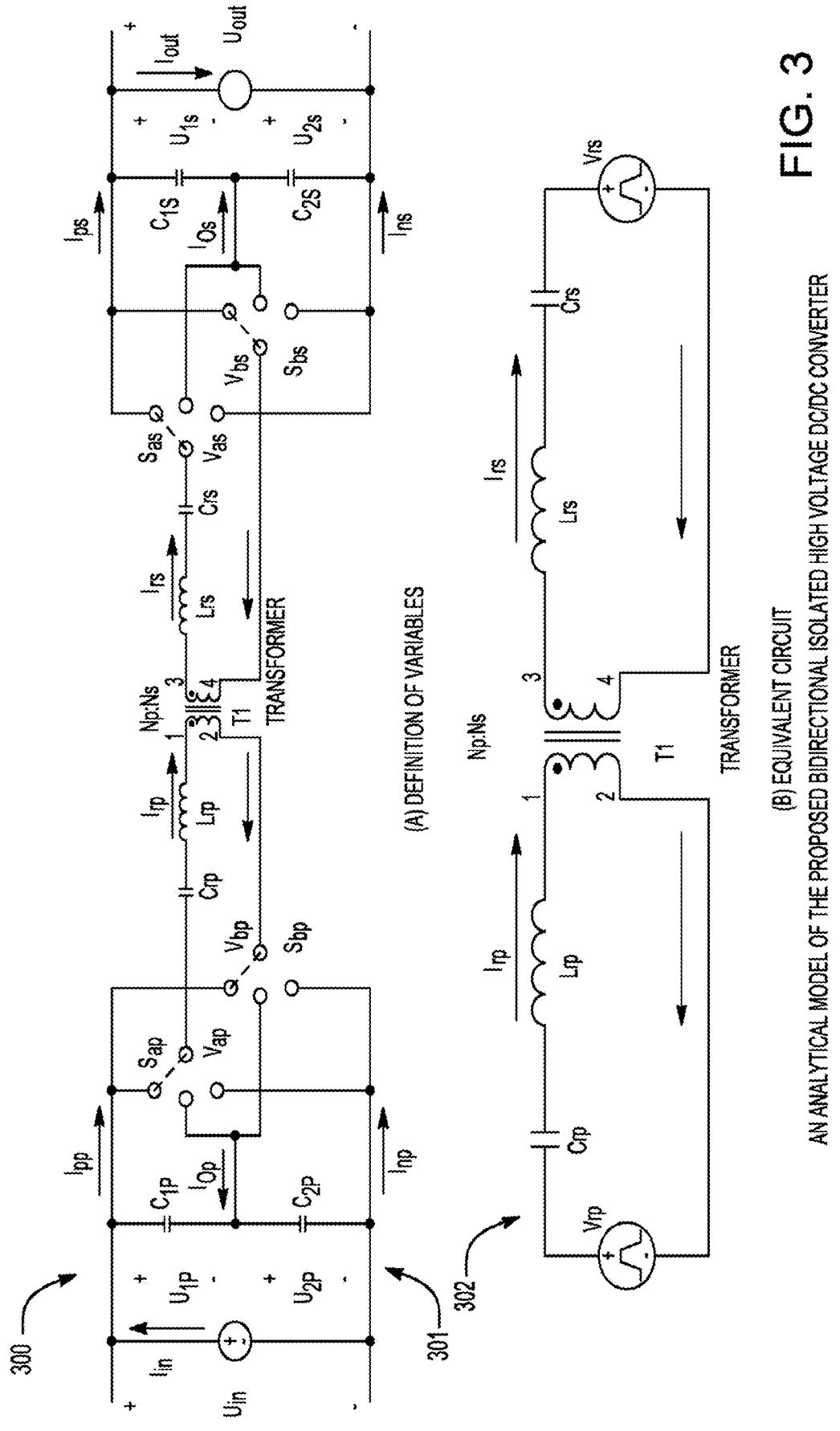
FIG. 3 presents an analytical model of the proposed bidirectional isolated high voltage DC/DC converter.

FIG. 3 presents an analytical model of the proposed bidirectional isolated high voltage DC/DC converter.

The switching variables are defined as: $S_{ap}$, $S_{bp}$, $S_{as}$, $S_{bs}$:

$$S_{ij} = \begin{cases} +1, \text{ when connected to the positive } DC \text{ bus} \\ 0, \text{ when connected to the cap mid point, } i = a, b; j = p, s \\ -1, \text{ when connected to the negative } DC \text{ bus} \end{cases}$$

The power flow direction variable is defined as DIR and is set based on power flow direction:

$$DIR = \begin{cases} 1, \text{ when power flows from primary to secondary} \\ -1, \text{ when power flows from secondary to primary} \end{cases}$$

For the primary side:

$$\text{Let } v_p = \frac{1}{2}(u_{1p} - u_{2p}), \text{ then } u_{1p} = v_p + \frac{u_{in}}{2} \text{ and } u_{2p} = -v_p + \frac{u_{in}}{2}.$$

$$v_{ip} = \begin{cases} v_p + \frac{u_{in}}{2}, \text{ when } S_{ip} = +1 \\ 0, \quad \text{when } S_{ip} = 0, \text{ so } v_{ip} = S_{ip}^2 v_p + S_{ip}\frac{u_{in}}{2}, i = a, b \\ v_p - \frac{u_{in}}{2}, \text{ when } S_{ip} = -1 \end{cases}$$

The task of the control function is to synthesize $v_{ap}$, $v_{bp}$ (and $v_{as}$, $v_{bs}$ on the secondary side) according to the output voltage regulation requirement by the PWM switching of the active power devices.

The voltage applied to the resonant tank then is:

$$v_{rp} = v_{ap} - v_{bp} = \left(S_{ap}^2 - S_{bp}^2\right)v_p + (S_{ap} - S_{bp})\frac{u_{in}}{2},$$

If we convert to per unit voltage with base $$V_{pbase} = \frac{u_{in}}{2},$$

then $$v_{rp,pu} = v_{p,pu}\left(S_{ap}^2 - S_{bp}^2\right) + (S_{ap} - S_{bp}), \text{ where } v_{p,pu} = \frac{v_p}{V_{pbase}} = \frac{v_p}{\frac{u_{in}}{2}}.$$

The setup may produce $3^2 = 9$ possible binary switching states wherein some switching states are equivalent.

Figure 4:
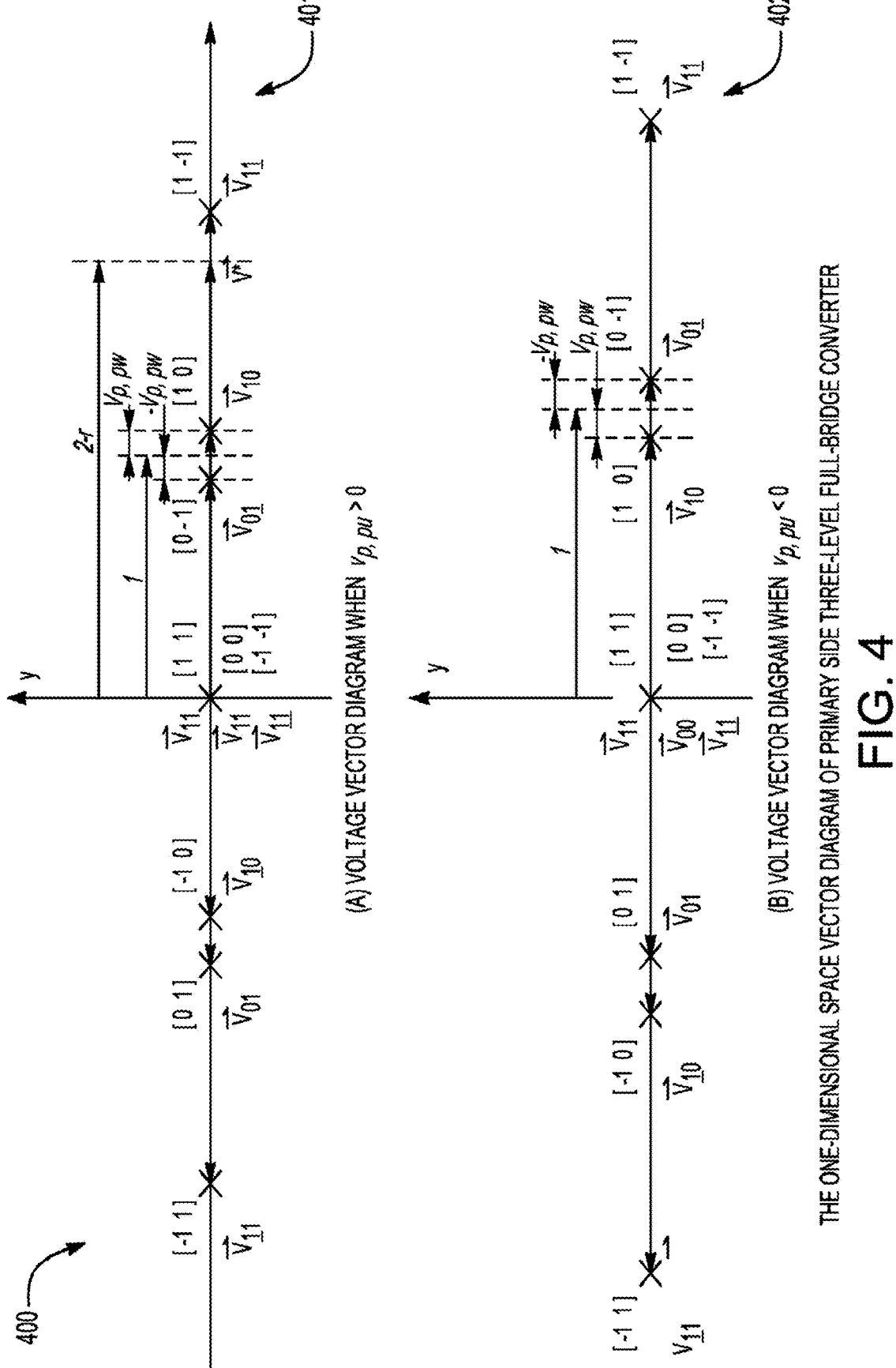
FIG. 4 presents a one-dimensional space vector diagram of the primary side three-level full-bridge converter.

FIG. 4 presents two one-dimensional space vector diagrams 400. Voltage vectors are presented along the x-axis and states are marked alongside the vectors. The total switching states are listed in table 1.

TABLE 1

Switching Volage Vectors of Primary Side Full-Bridge Converter

| $[S_{ap} S_{bp}]$ | $v_{rp, pu}$ | $i_{0p}$ | Vector Designator |
|---|---|---|---|
| [0 0] | 0 | 0 | $\vec{V}_{00}$ |
| [1 1] | 0 | 0 | $\vec{V}_{11}$ |
| [−1 −1] | 0 | 0 | $\vec{V}_{\underline{1}\underline{1}}$ |
| [1 0] | $1 + v_{p ,pu}$ | $i_{rp}$ | $\vec{V}_{10}$ |
| [0 −1] | $1 - v_{p, pu}$ | $-i_{rp}$ | $\vec{V}_{0\underline{1}}$ |
| [−1 0] | $-1 + v_{p, pu}$ | $i_{rp}$ | $\vec{V}_{\underline{1}0}$ |
| [0 1] | $-1 - v_{p, pu}$ | $-i_{rp}$ | $\vec{V}_{01}$ |
| [1 −1] | 2 | 0 | $\vec{V}_{1\underline{1}}$ |
| [−1 1] | −2 | 0 | $\vec{V}_{\underline{1}1}$ |

Unlike traditional approaches, we are taking account of the capacitor middle point deviation variable $v_p$ or $v_{p,pu}$ into this space vector representation. The resultant switching space vector diagram is shown in FIG. 4 (a), 401 for the condition $v_p > 0$, and in FIG. 4 (b), 402 for the condition $v_p < 0$. All vectors are identified by the switching state $[S_{ap} S_{bp}]$. The associated information for the current $i_{0p}$ flowing into the capacitor middle point is also listed in table 1.

Compared with the idealized switching space vector diagram for one-phase three-level converters, the middle space vectors ($\vec{V}_{10}$, $\vec{V}_{01}$, $\vec{V}_{\underline{1}0}$, $\vec{V}_{0\underline{1}}$) are dispersed under non-ideal capacitor voltage distribution condition. To synthesize the required command voltage vector $\vec{V}^*$, we have redundancy in choosing these middle vectors and this design freedom will be used to regulate the capacitor middle point voltage.

Assume that the two capacitors are of equal capacitance i.e., $C_{1P} = C_{2P} = C_P$.

Then $$2C_P \frac{dv_p}{dt} = -i_{0p}.$$

Applying sliding mode control with sliding surface $\{v_p = 0\}$, or directly checking by Lyapunov stability criteria, generally, the middle two vectors aligned in the same direction can be weighted differentially to result in:

$i_{0p}$ whose sign is favorable for regulating $v_p$ to zero.

Figure 5:
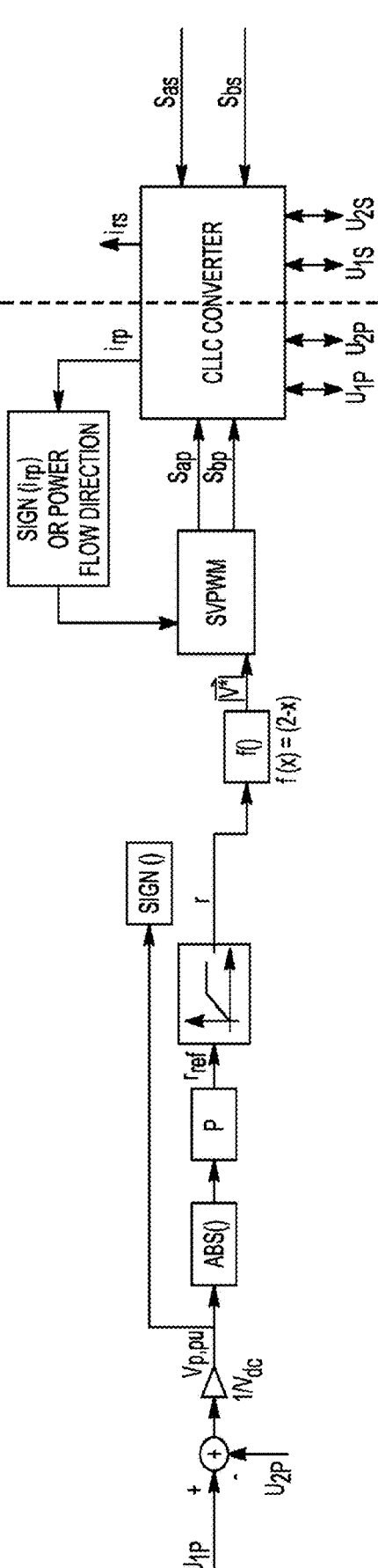
FIG. 5 presents a proposal capacitor middle point voltage controller for three-level full bridge LLC converter (illustrated for the primary side)

FIG. 5 presents a new capacitor middle point voltage regulator comprised of a three-level full bridge CLLC converter as illustrated on the primary side.

Such a device employs many modules such as, but not limited to, the Space Vector Pulse Width Modulation (SVPWM). This process employs a command voltage vector $$\vec{v^*} = (2 - |r|) * \frac{u_{in}}{2}$$

as shown in FIG. 4 (a) 401 and is generated by the capacitor middle point voltage controller. The nearest two vectors comprise:

$\vec{V}_{11}$ and one of $\vec{V}_{10}$ and $\vec{V}_{01}$ will be utlized to synthesize $\vec{V}^*$ by the volt-second balance principle. The choice of $\vec{V}_{10}$ or $\vec{V}_{0\underline{1}}$ is based on the required direction of $i_{0p}$ with an overall effect within a PWM cycle. This is possible because $\vec{V}_{10}$ and $\vec{V}_{0\underline{1}}$ result in an top with opposite signs. The decision algorithm is shown in table 2. Once this is determined (denoted as $\vec{V}_x$), the remaining task is to perform the voltage vector synthesis, for example when $v^* > 0$, by $\vec{V}_{11}$, $\vec{V}_x$:

$$T_1 \vec{V}_{11} + T_2 \vec{V}_x = \frac{T_s}{2} \vec{v^*}, \text{ where } T_1 + T_2 = \frac{T_s}{2}.$$

TABLE 2

Redundant Space Vector Selection

| | $v_p > 0$ | | $v_p < 0$ | |
|---|---|---|---|---|
| | DIR = 1 | DIR = −1 | DIR = 1 | DIR = −1 |
| $v^* > 0$ | $\vec{V}_{10}$ | $\vec{V}_{0\underline{1}}$ | $\vec{V}_{0\underline{1}}$ | $\vec{V}_{10}$ |
| $v^* < 0$ | $\vec{V}_{01}$ | $\vec{V}_{\underline{1}0}$ | $\vec{V}_{\underline{1}0}$ | $\vec{V}_{01}$ |

From Table 2, $V_x = \text{sign}(v^*)(1 + \text{DIR}*|v_{p,pu}|)$.

Solving for $T_1$ and $T_2$, may be performed by use of the equation:

$$T_1 = \frac{T_s}{2} - \frac{r}{1 - DIR*|v_{p,pu}|} * \frac{T_s}{2}, T_2 = \frac{r}{1 - DIR*|v_{p,pu}|} * \frac{T_s}{2}$$

As to the position arrangement of these space vectors within each PWM cycle, the vector $\vec{V}_x$ can be put in the middle of the half resonant cycle so that the resonant current is at or close to its peak. The vector sequencing pattern is then $\vec{V}_{11}(T_1) \to \vec{V}_x(T_2) \to \vec{V}_x(T_2) \to \vec{V}_{11}(T_1)$. They can also be positioned with a phase shift with regard to this ideal position adapting to the operating condition.

Figure 6:
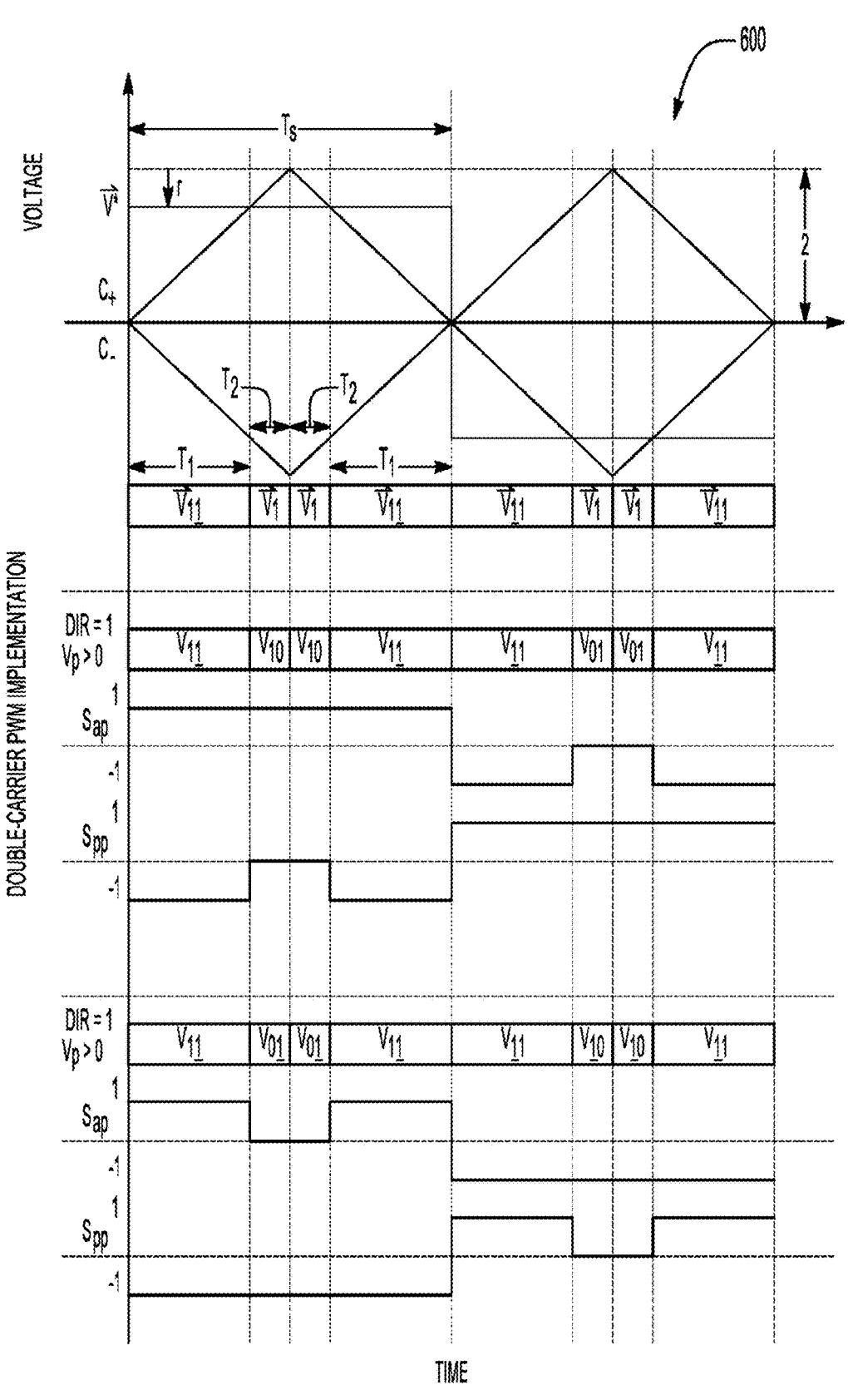
FIG. 6 presents a simplified double-carrier PWM implementation of the SVPWM

FIG. 6 presents a definition of $T_1$, $T_2$ and $T_S$ for the simplified space vector synthesis which may be implemented by the carrier based PWM approach. In this case, the capacitor middle point voltage drift is assumed to be small and has low impact to the carrier amplitude.

For the secondary side, the same SVPWM theory and capacitor middle point voltage control theory applies equally well to the secondary full bridge. The secondary side PWM can have a phase shift with respect to the primary PWM. For brevity purpose, the full description is omitted. There exist some good, standard output voltage controls based on a combination of PWM frequency modulation and delay-time control. Same is with the power flow management.

Operating Modes results from combining the output voltage control, primary and secondary capacitor middle point voltage control and bidirectional power flow management together. Different voltage vector combinations are identified during various operation conditions by Modes of Operation.

Figure 7:
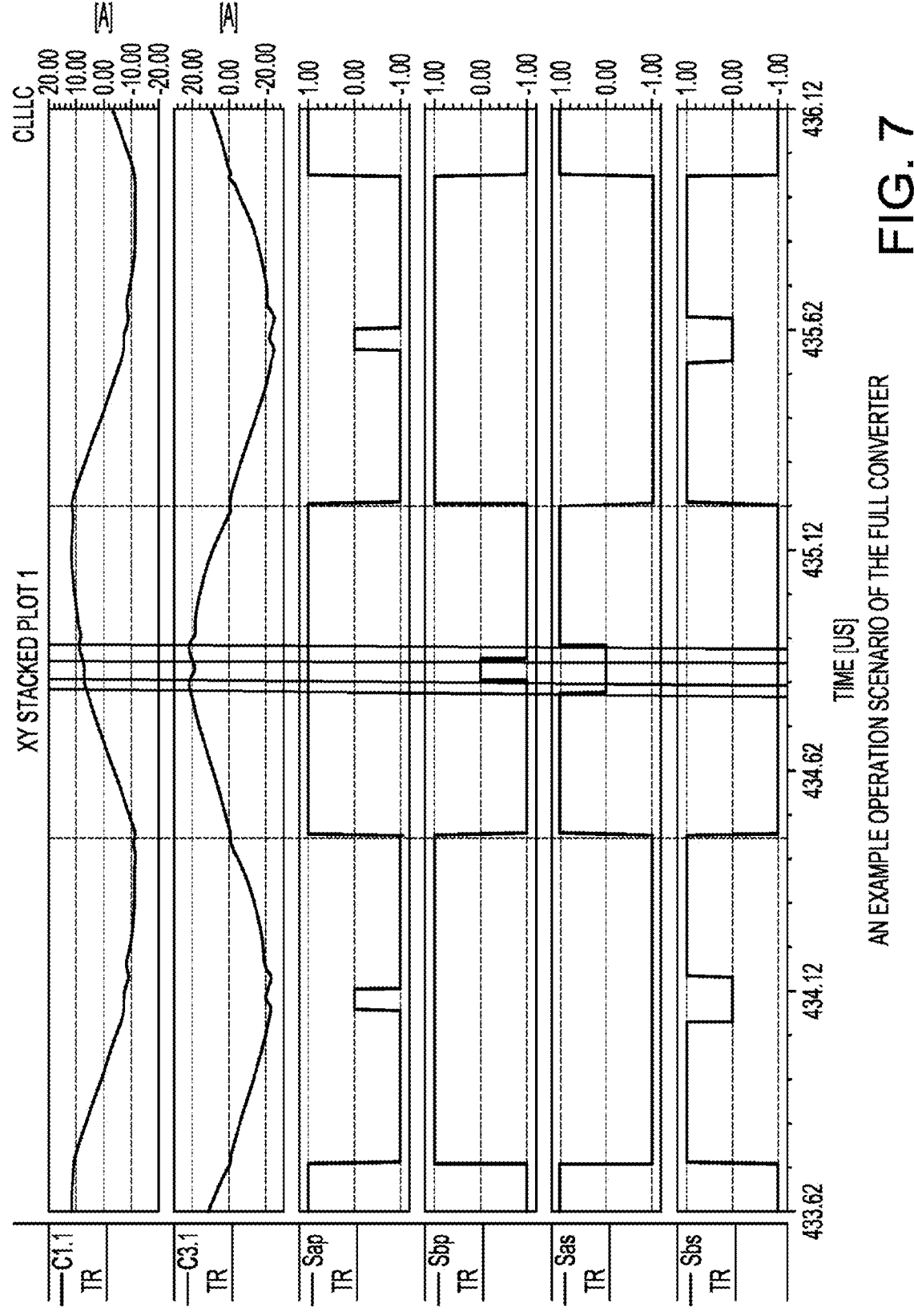
FIG. 7 presents an exemplary operation scenario of the full converter.

FIG. 7 presents an operation example where the primary and secondary 3-level voltage vectors are shown together with the resultant primary and secondary side tank current under certain dynamic conditions. Correspondingly, table 3 lists the major modes under this condition of a positive power flow (DIR=1) and positive capacitor middle point voltage deviations ($v_p > 0$, $v_s > 0$). Information on semiconductor switches' On/Off status and the current flowing into the capacitor middle points are also compiled in the same table. In this example, the operation goes through the following mode sequence: Mode#1->Mode#2->Mode#3->Mode#2->Mode#1->Mode#4->Mode#5->Mode#6->Mode#5->Mode#4. The mode sequence as per FIGS. 8 to 13 comprise: Mode#1 800->Mode#2 900->Mode#3 1000->Mode#2 900->Mode#1 800->Mode#4 1100->Mode#5 1200->Mode#6 1300->Mode#5 1200->Mode#4 1100. A similar table could be drawn for the other conditions.

The elements that are displayed in diagram 800 are "open" which prevents the flow of current through these points. Each of FIGS. 8 through 13 presenting modes 1, 2, 3, 4, 5, and 6 shares this same convention with illustrated switches presented as "off" and not illustrated switches presented as "on". The primary side and secondary side resonant current flows are indicated by the directed dotted lines which pass past the switch locations.

TABLE 3

| Major Modes of The Example Operation Scenario Under the Condition of Positive Power Flow (DIR = 1), Positive Capacitor Middle Point Voltage Deviations ($v_p > 0$, $v_s > 0$) | | | | | |
|---|---|---|---|---|---|
| Mode # | FIG. # | Primary Side Switches On/Off | Current into primary side cap middle point | Secondary Side Switches On/Off | Current into second side cap middle point |
| 1 | 8 | Q1P/Q2P/Q7P/Q8P = ON Q3P/Q4P/Q5P/Q6P = OFF | 0 | Q1S/Q4S = ON Q2S/Q3S, Q5S-Q8S = OFF | 0 |
| 2 | 9 | Q1P/Q2P/Q7P/Q8P = ON Q3P/Q4P/Q5P/Q6P = OFF | 0 | Q4S/Q5S/Q6S = ON Q1S-Q3S, Q7S, Q8S = OFF | $i_{rs}$ |
| 3 | 10 | Q1P/Q2P/Q6P/Q7P = ON Q3P/Q4P/Q5P/Q8P = OFF | $i_{rp}$ | Q4S/Q5S/Q6S = ON Q1S/-Q3S/Q7S/Q8S = OFF | $i_{rs}$ |
| 4 | 11 | Q3P/Q4P/Q5P/Q6P = ON Q1P/Q2P/Q7P/Q8P = OFF | 0 | Q2S/Q3S = ON Q1S, Q4S-Q8S = OFF | 0 |
| 5 | 12 | Q3P/Q4P/Q5P/Q6P = ON Q1P/Q2P/Q7P/Q8P = OFF | 0 | Q2S/Q7S/Q8S = ON Q1S/Q3S-Q6S = OFF | $-i_{rs}$ |
| 6 | 13 | Q2P/Q3P/Q5P/Q6P = ON Q1P/Q4P/Q7P/Q8P = OFF | $-i_{rp}$ | Q2S/Q7S/Q8S = ON Q1S/Q3S-Q6S = OFF | $-i_{rs}$ |

During mode transitions, there are other possible combinations, such as all switching devices Q1P-Q8P 251-258 and Q1S-Q8S 271-278 being off, to assist the transitions in a resonant fashion. The resonant switching processes reduce switching loss and lower the EMI emissions.

Figure 8:
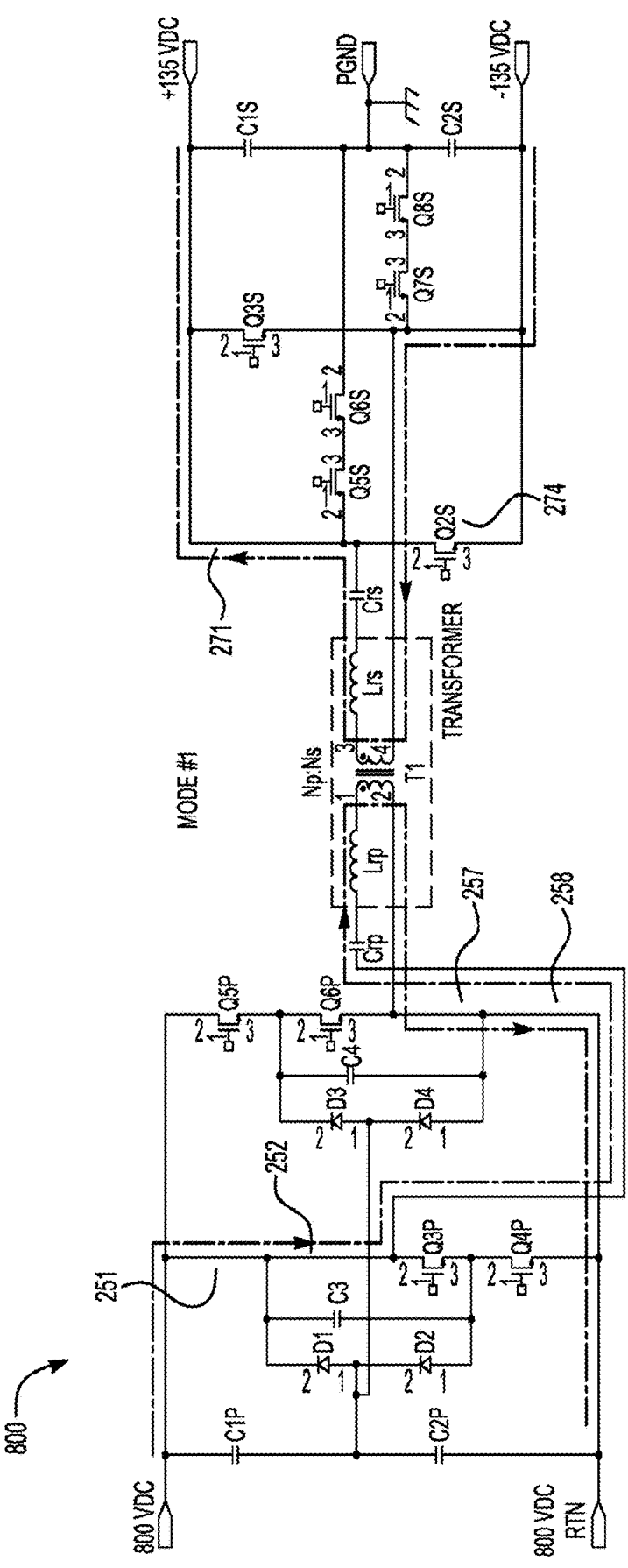
FIG. 8 presents an exemplary operation scenario mode 1 of the exemplary electrical circuit diagram.

FIG. 8 presents an exemplary electrical circuit diagram 800 of mode of operation number 1 of table 3, wherein the primary three-level circuit 120 is a neutral-point-clamped (NPC) three-level full bridge circuit, the CLLC resonant tank network 140 is connected to the NPC three-level full bridge circuit, and the secondary three-level circuit 160 is a T-type three-level circuit connected to the CLLC resonant tank network. The device also contains a controller 180. The Mode 1 circuit 800 contains the same components as presented in the previous diagram presented as element number 200 of FIG. 2, and also the components are presented as using the same elements numbers as FIG. 2. In Mode 1 800 the primary side switches Q1P 251, Q2P 252, Q7P 257, Q8P 258 and the secondary switches Q1S 271, Q4S 274 are of the status of turned "on".

When compared to FIG. 2, many of the switch components illustrated by element number in FIG. 1 are not illustrated in the present FIG. 8. The components not illustrated in FIG. 8 are in fact are turned to the "on" or "closed" position. Such components are still located in the diagram, but they are an engaged, closed switch that acts as a wire such that current flows through the point illustrated by the element number. The status of "on" is denoted by the element number pointing at a point where the switch is not presently illustrated in the circuit diagram 800 as when compared to the previous circuit diagram 200. The element numbers which point at the location where the switches are illustrated are presented to indicate that such switches are "off" or "open". Such illustrated switches act as a broken wire such that current does not flow through these locations.

Figure 9:
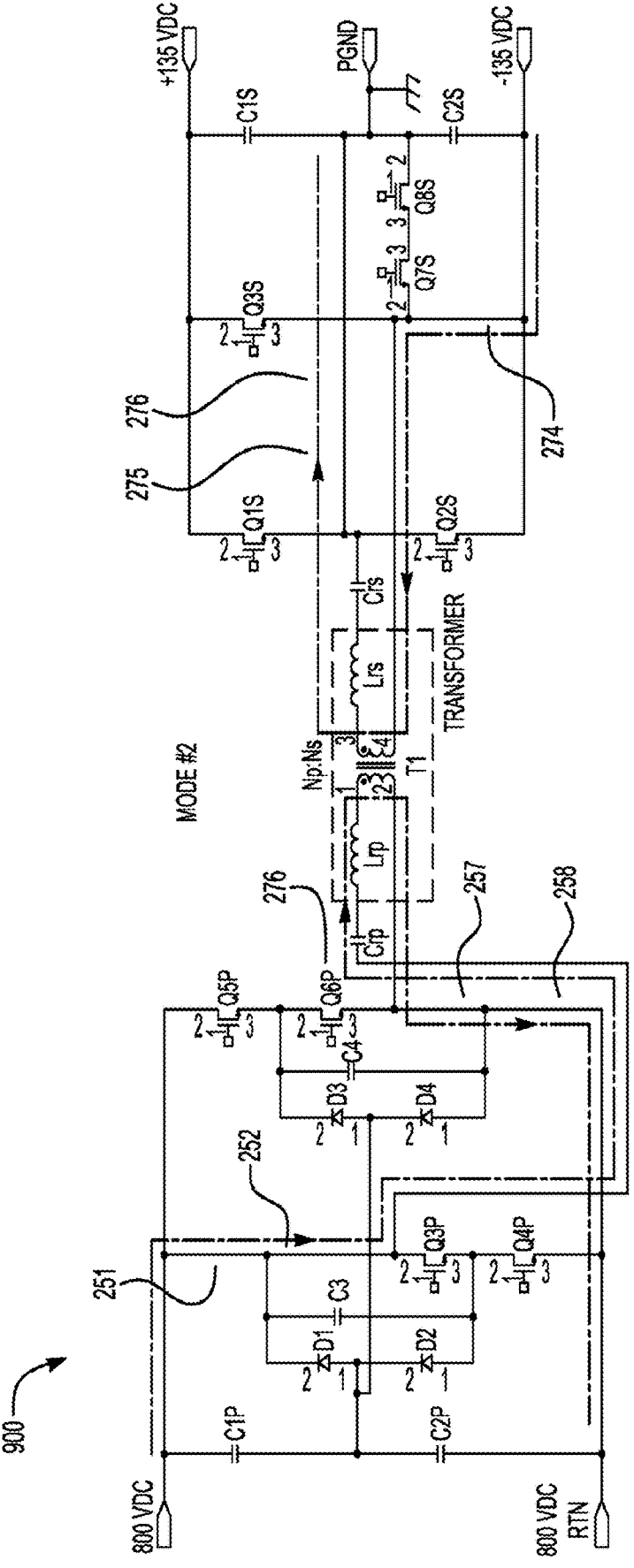
FIG. 9 presents an exemplary operation scenario mode 2 of the exemplary electrical circuit diagram.

FIG. 9 presents an exemplary electrical circuit diagram 900 of mode of operation number 2 of Table 3. The Mode 2 circuit 900 contains the same components as presented in the previous diagram 200 of FIG. 2, including that the primary three-level circuit 120 contains a neutral-point-clamped (NPC) three-level full bridge circuit, the CLLC resonant tank network 140 is connected to the NPC three-level full bridge circuit, and the secondary three-level circuit 160 is a T-type three-level circuit connected to the CLLC resonant tank network. The device also contains a controller 180. In Mode 2 900 the primary side switches Q1P 251, Q2P 252, Q7P 257, Q8P 258 and the secondary switches Q4S 274, Q5S 275, Q6S 276 are turned on. The primary side and secondary side resonant current are flowing as indicated by the directed dotted lines.

Figure 10:
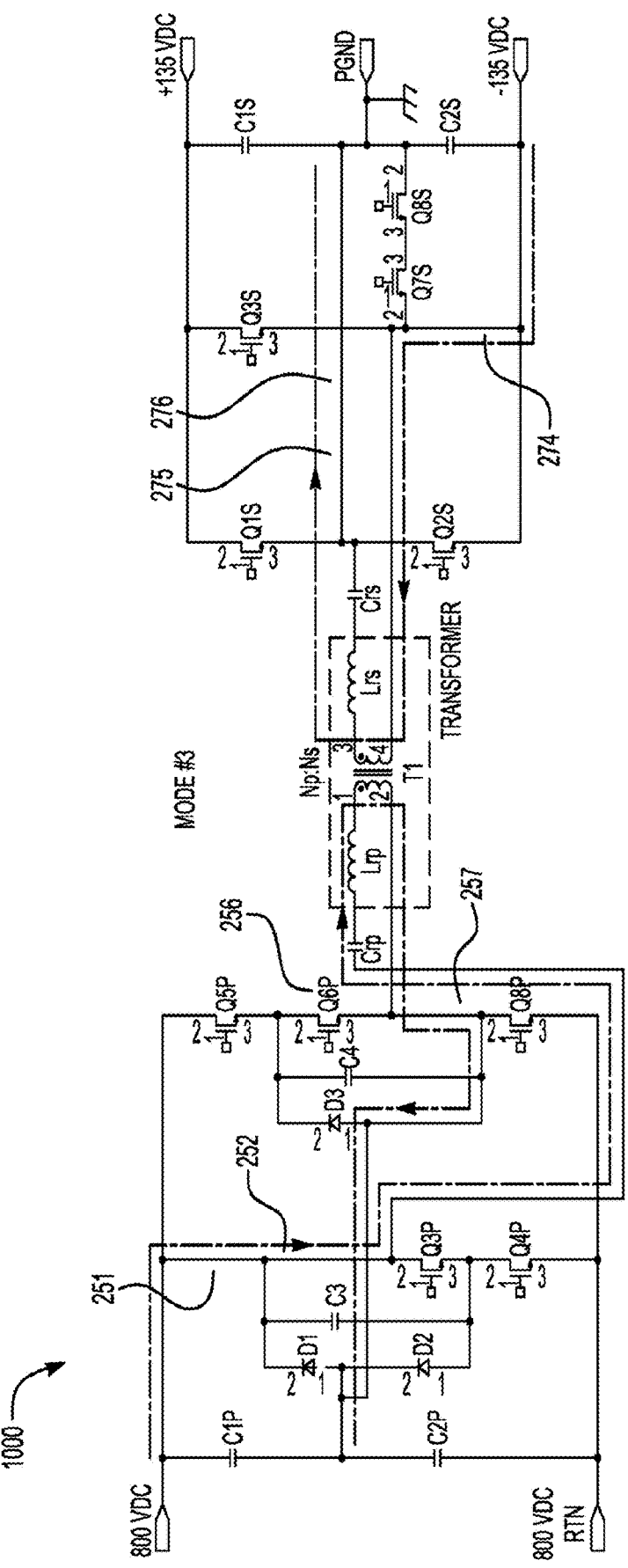
FIG. 10 presents an exemplary operation scenario mode 3 of the exemplary electrical circuit diagram.

FIG. 10 presents an exemplary electrical circuit diagram 1000 of mode of operation number 3 of table 3. The Mode 3 circuit 1000 contains the same components as presented in the previous diagram 200 of FIG. 2, including that the primary three- level circuit 120 is a neutral-point-clamped (NPC) three-level full bridge circuit, the CLLC resonant tank network 140 is connected to the NPC three-level full bridge circuit, and the secondary three-level circuit 160 is a T-type three-level circuit connected to the CLLC resonant tank network. The device also contains a controller 180. In Mode 3 1000 the primary side switches Q1P 251, Q2P 252, Q6P 256, Q7P 257 and the secondary switches Q4S 274, Q5S 275, Q6S 276 are turned on. The primary side and secondary side resonant current are flowing as indicated by the directed dotted lines.

Figure 11:
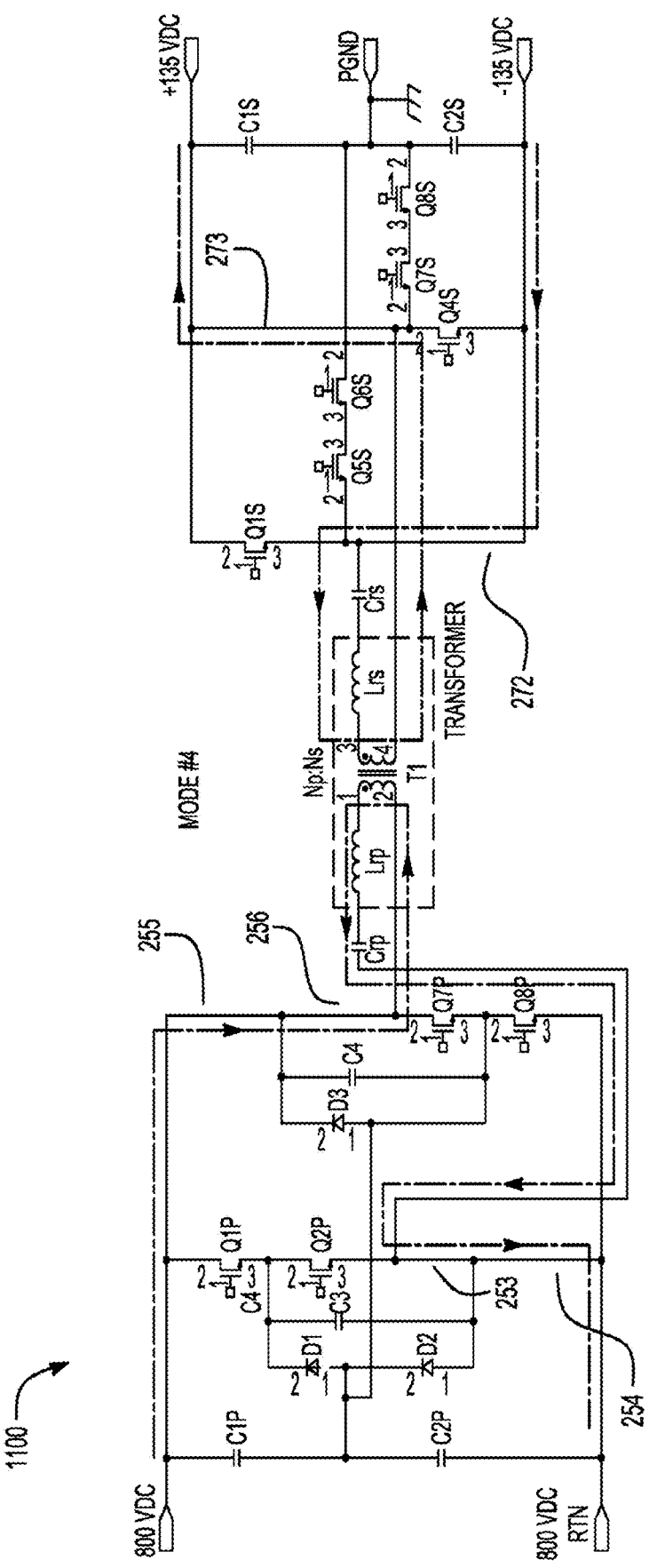
FIG. 11 presents an exemplary operation scenario mode 4 of the exemplary electrical circuit diagram.

FIG. 11 illustrates an exemplary electrical circuit diagram 1100 of mode of operation number 4 of table 3. The Mode 4 circuit 1100 contains the same components as presented in the previous diagram 200 of FIG. 2, including that the primary three-level circuit 120 is a neutral-point-clamped (NPC) three-level full bridge circuit, the CLLC resonant tank network 140 is connected to the NPC three-level full bridge circuit, and the secondary three-level circuit 160 is a T-type three-level circuit connected to the CLLC resonant tank network. The device also contains a controller 180. In Mode 4 1100 the primary side switches Q3P 253, Q4P 254, Q5P 255, Q6P 256 and the secondary switches Q2S 272, Q3S 273 are turned on. The primary side and secondary side resonant current are flowing as indicated by the directed dotted lines.

Figure 12:
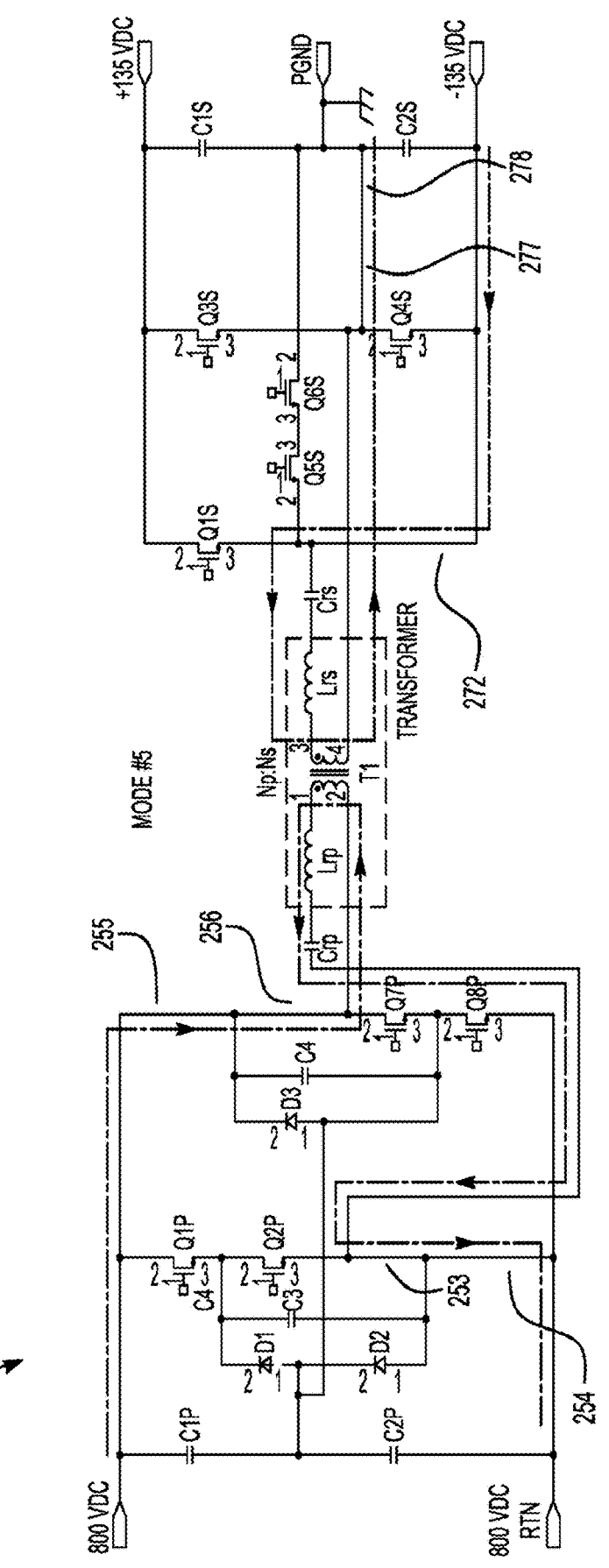
FIG. 12 presents an exemplary operation scenario mode 5 of the exemplary electrical circuit diagram.

FIG. 12 illustrates an exemplary electrical circuit diagram 1200 of mode of operation number 5 of table 3. The Mode 5 circuit 1200 contains the same components as presented in the previous diagram 200 of FIG. 2, including that the primary three-level circuit 120 is a neutral-point-clamped (NPC) three-level full bridge circuit, the CLLC resonant tank network 140 is connected to the NPC three-level full bridge circuit, and the secondary three-level circuit 160 is a T-type three-level circuit connected to the CLLC resonant tank network. The device also contains a controller 180. In Mode 5 1200 the primary side switches Q3P 253, Q4P 254, Q5P 255, Q6P 256 and the secondary switches Q2S 272, Q7S 277, Q8S 278 are turned on. The primary side and secondary side resonant current are flowing as indicated by the directed dotted lines.

Figure 13:
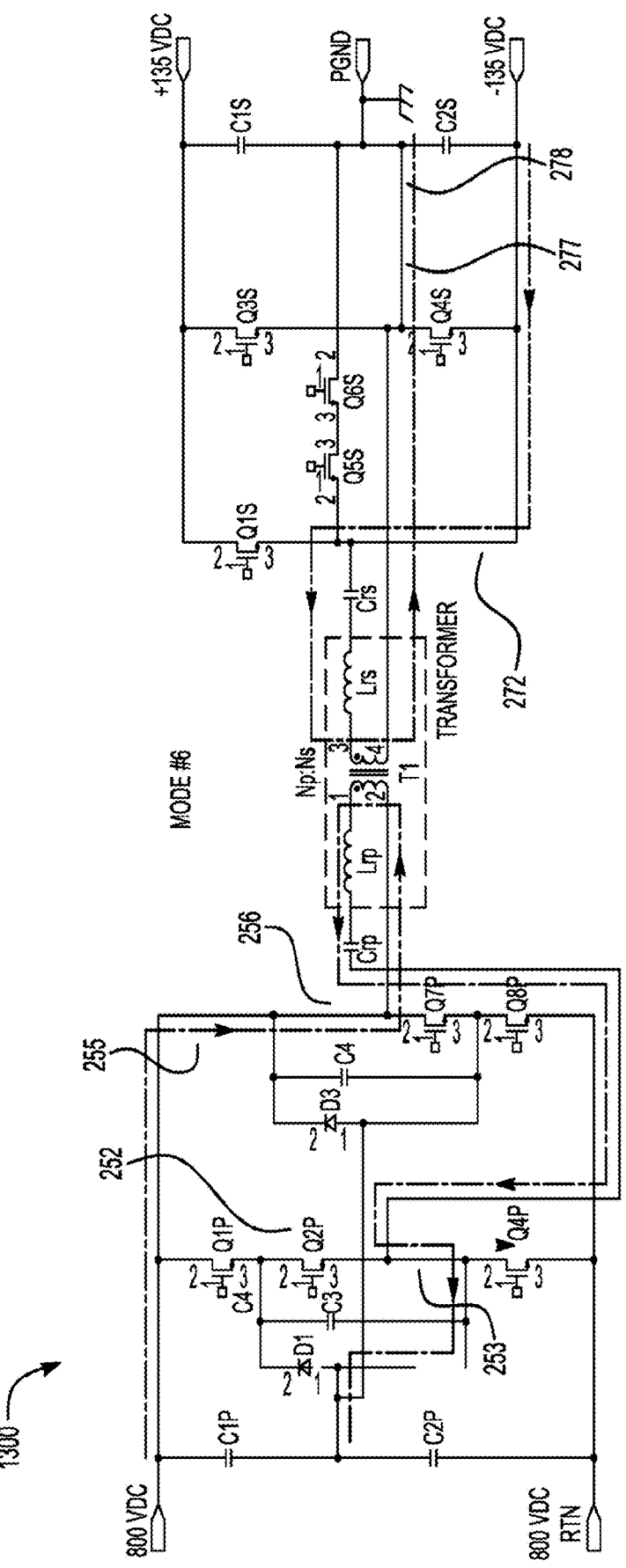
FIG. 13 presents an exemplary operation scenario mode 6 of the exemplary electrical circuit diagram.

FIG. 13 illustrates an exemplary electrical circuit diagram 1300 of mode of operation number 6 of table 3. The Mode 6 circuit 1300 contains the same components as presented in the previous diagram 200 of FIG. 2, including that the primary three-level circuit 120 is a neutral-point-clamped (NPC) three-level full bridge circuit, the CLLC resonant tank network 140 is connected to the NPC three-level full bridge circuit, and the secondary three-level circuit 160 is a T-type three-level circuit connected to the CLLC resonant tank network. The device also contains a controller 180. In Mode 6 1300 the primary side switches Q2P 252, Q3P 253, Q5P 255, Q6P 256 and the secondary switches Q2S 272, Q7S 277, Q8S 278 are turned on. The primary side and secondary side resonant current are flowing as indicated by the directed dotted lines.

FIG. 14 illustrates an exemplary flow diagram for a method 1400 for bidirectionally converting a high DC voltage to a low DC voltage. At step 1402, when converting the high DC voltage to the low DC voltage, the method includes modulating, by a primary three-level circuit including a primary split DC-link bus, a high voltage DC signal to a high voltage AC signal. At step 1404, the method 1400 includes transforming, by a CLLC resonant tank network including an isolation transformer, the high voltage AC signal to a low voltage AC signal. At step 1406, the method 1400 includes rectifying, by a secondary three-level circuit including a secondary split DC-link bus, the low voltage AC signal to a low voltage DC signal. At step 1408, when converting the low DC voltage to the high DC voltage, the method 1400 includes modulating, by the secondary three-level circuit including the secondary split DC-link bus, the low voltage DC signal to the low voltage AC signal. At step 1410, the method 1400 includes transforming, by CLLC resonant tank network including an isolation transformer, the low voltage AC signal to a high voltage AC signal. At step 1412, the method 1400 includes rectifying, by the primary three-level circuit including the primary split DC-link bus, the high voltage AC signal to a high voltage DC signal.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An isolated bidirectional DC-DC converter, comprising:

a primary three-level input circuit including a primary split DC-link bus;

an active split DC-link bus middle point high voltage side voltage control; wherein the high voltage side terminal is configured to receive or transmit a high voltage DC signal;

a capacitor-inductor-inductor-capacitor (CLLC) resonant tank connected to the primary three-level input circuit, the CLLC resonant tank including an isolation transformer, wherein the isolation transformer isolates the primary three-level input circuit from the second three-level circuit;

wherein a capacitor and inductor are placed before the transformer in the CLLC resonant tank;

a secondary three-level output circuit connected to the CLLC resonant tank, the secondary three-level output circuit including a secondary split DC-link bus;

an active split DC-link bus middle point low voltage side voltage control; and a segmentized input high voltage bus, whereby all primary switches and capacitors are 50% voltage rated relative to standard two-level converters;

wherein the isolation transformer isolates the primary three-level input circuit from the secondary three-level circuit.

2. The isolated bidirectional DC-DC converter of claim 1, wherein the primary three-level input circuit is configured as a neutral-point-clamped (NPC) three-level full bridge circuit.

3. The isolated bidirectional DC-DC converter of claim 1, wherein the secondary three-level output circuit is configured as a T-type three-level circuit.

4. The isolated bidirectional DC-DC converter of claim 1, wherein the primary split DC-link bus includes a primary capacitor middle point associated with a primary middle point voltage; and the bidirectional DC-DC converter further comprises a controller configured to actively control the primary middle point voltage.

5. The isolated bidirectional DC-DC converter of claim 1, wherein the secondary split DC-link bus includes a secondary capacitor middle point associated with a secondary middle point voltage; and the bidirectional DC-DC converter further comprises a controller configured to actively control the secondary middle point voltage.

6. The isolated bidirectional DC-DC converter of claim 5, wherein the secondary split DC-link bus comprises a secondary positive DC bus and a symmetrical secondary negative DC bus.

7. The isolated bidirectional DC-DC converter of claim 1, wherein the secondary capacitor middle point is connected to an earth ground which is referenced as an electronics chassis.

8. The isolated bidirectional DC-DC converter of claim 1, wherein the primary three-level input circuit further comprises a gallium nitride (GaN)-based transistors configured to perform high-frequency switching, and wherein the secondary three-level output circuit further comprises a gallium nitride (GaN)-based transistors configured to perform high-frequency switching.

9. The isolated bidirectional DC-DC converter of claim 1, further comprising a controller configured to actively control the first middle point voltage.

10. The isolated bidirectional DC-DC converter of claim 1, wherein the converter is implemented with health monitoring functionality and disconnects an inductive motor drive load from a power bus safely upon a motor drive inverter failure.

11. The isolated bidirectional DC-DC converter of claim 1, wherein the converter is bidirectional and operates standard flight control actuators without regenerated energy dissipated inside the flight controller actuators.

12. The isolated bidirectional DC-DC converter of claim 1, wherein the output is soft started with an inrush current control during application of the input voltage.

13. A space vector PWM (SVPWM) method for bidirectionally converting between a high DC voltage and a low DC voltage, comprising:

converting the high DC voltage to the low DC voltage by modulating the high voltage DC signal to a high voltage AC signal by a primary three-level circuit including a primary split DC-link bus according to the SVPWM process;

sensing an input DC bus capacitor middle point voltage deviation;

incorporating the sensed input DC bus capacitor middle point voltage deviation into a modified SVPWM algorithm, wherein a sensed input DC bus capacitor middle point voltage deviation is used to perform 1-dimensional SVPWM;

transforming the high voltage AC signal to a low voltage AC signal using a CLLC resonant tank network comprising an isolation transformer;

rectifying the low voltage AC signal to a low voltage DC signal using a secondary three-level output circuit including a secondary split DC-link;

converting the low DC voltage to the high DC voltage by modulating the low voltage DC signal to a low voltage AC signal using the secondary three-level output circuit and a secondary split DC-link bus;

transforming by the CLLC resonant tank network including the isolation transformer; and rectifying the high voltage AC signal to a high voltage DC signal by using primary three-level circuit including the primary split DC-link bus.

14. The SVPWM method of claim 13, wherein the primary three-level input circuit comprises a neutral-point-clamped (NPC) three-level full bridge circuit that uses a modified SVPWM algorithm, wherein the primary bus capacitor middle point voltage deviations is used to perform the 1-dimentional SVPWM.

15. The SVPWM method of claim 13, wherein the secondary three-level output circuit is configured as a T-type three-level circuit that uses a modified SVPWM algorithm, wherein the secondary bus capacitor middle point voltage deviations is used to perform the 1-dimentional SVPWM.

16. The SVPWM method of claim 13, further comprising controlling, by a controller, a primary capacitor middle point voltage associated with a primary capacitor middle point of the primary split DC-link bus.

17. The SVPWM method of claim 13, further comprising controlling, by a controller, a secondary capacitor middle point voltage associated with a secondary capacitor middle point of the secondary split DC-link bus.

18. An isolated bidirectional DC-DC converter, comprising:

a primary three-level input circuit including a primary split DC-link bus;

an active split DC-link bus middle point high voltage side voltage control; wherein the high voltage side terminal is configured to receive or transmit a high voltage DC signal;

a capacitor-inductor-inductor-capacitor (CLLC) resonant tank connected to the primary three-level input circuit, the CLLC resonant tank including an isolation transformer, wherein a first capacitor and a first inductor are connected in series to a primary winding of the isolation transformer in the CLLC resonant tank;

wherein a second inductor and a second capacitor are connected in series to a secondary winding of the isolation transformer in the CLLC resonant tank;

a secondary three-level output circuit connected to the CLLC resonant tank, the secondary three-level output circuit including a secondary split DC-link bus;

an active split DC-link bus middle point low voltage side voltage control; and a controller configured to control a primary capacitor middle point voltage and a secondary capacitor middle point voltage in accordance with a modified SVPWM algorithm, wherein capacitor middle point voltage deviation is used to perform 1-dimensional SVPWM;

wherein the isolation transformer isolates the primary three-level input circuit from the secondary three-level circuit.

19. The isolated bidirectional DC-DC converter of claim 18, wherein the controller is configured to:

sense an input DC bus capacitor middle point voltage deviation; and incorporate the sensed input DC bus capacitor middle point voltage deviation into the modified SVPWM algorithm, wherein a polarity of the input DC bus capacitor middle point voltage deviation is included in the 1-dimensional SVPWM.

20. The isolated bidirectional DC-DC converter of claim 19, further comprising a segmentized input high voltage bus, whereby all primary switches and capacitors are 50% voltage rated relative to standard two-level converters, wherein the secondary capacitor middle point is connected to an earth ground which is referenced as an electronics chassis.

* * * * *